United States Patent [19]

Uto et al.

[11] 3,861,883

[45] Jan. 21, 1975

[54] METHOD OF MAKING WELDED JOINTS FOR LARGE VESSELS SUBJECT TO HYDROGEN EMBRITTLEMENT

[75] Inventors: Yoshimitsu Uto; Yasuhiro Iwasaki, both of Hiroshima; Yoshihiro Yamamoto, Hiroshima-ken; Tsutomu Ooe, Hiroshima-ken; Ryohei Nakayama, Hiroshima-ken, all of Japan

[73] Assignee: Mitsubishi Jukogyo Kabushiki Kaisha, Tokyo, Japan

[22] Filed: Apr. 26, 1972

[21] Appl. No.: 247,634

Related U.S. Application Data

[63] Continuation-in-part of Ser. No. 869,253, Oct. 24, 1969, abandoned, which is a continuation-in-part of Ser. No. 627,889, April 3, 1967, abandoned.

[30] Foreign Application Priority Data

Apr. 12, 1966  Japan.............................. 41-23114

[52] U.S. Cl..................... 29/196.1, 29/472.3, 220/3
[51] Int. Cl.............................................. B23p 3/00
[58] Field of Search ............ 29/196.1, 472.3; 220/3

[56] References Cited
UNITED STATES PATENTS

| | | | |
|---|---|---|---|
| 3,128,001 | 4/1964 | Schmitz................................... | 220/3 |
| 3,163,501 | 12/1964 | Zimmer et al..................... | 29/196.1 |
| 3,224,619 | 12/1965 | Maurin et al. .......................... | 220/3 |
| 3,231,338 | 1/1966 | Andrus .................................. | 220/3 |
| 3,437,225 | 4/1969 | Wachter et al. ....................... | 220/3 |
| 3,464,802 | 9/1969 | Meyer............................... | 29/183.5 |

Primary Examiner—C. Lovell
Assistant Examiner—J. M. Davis
Attorney, Agent, or Firm—McGlew and Tuttle

[57] ABSTRACT

A welded joint construction is provided for large vessels, e.g., reaction vessels or tanks, having inner surfaces subject to hydrogen embrittlement and having a pair of multilayer laminated walls arranged to form a special weld joint. This joint is made by having a first metal cladded on at least a portion of the opposing edges of the weld joint and extending from the inner surface of the vessel subject to hydrogen embrittlement toward the opposite surface of the vessel. The first metal is (a) only slightly hardenable by the heat of welding, (b) resistant to hydrogen embrittlement, and (c) annealed prior to the welding of the joint. A quantity of the first metal weld is deposited between and joining the opposed faces of said first metal cladded on the edges of the weld joint. The welding of the joint is completed by depositing a second metal, which is only slightly hardenable by welding heat, between the opposed edges of the joint and extending from the first metal weld deposited therein toward the opposite outer surface of the vessel. At least one of the pair of walls which are joined consists of a plurality of layers of metal sheets (e.g., Cr-Mo or Mo steel) forming the exterior of the vessel, and an inner sheet forming the inner surface of the vessel which is made of steel rsistant to hydrogen embrittlement. Generally, the outer layer of sheets are only mechanically placed together without metallurgical joining, and also a plurality of vents are provided extending through these layers to the inner sheet's outer surface. The method joins such walls without necessity of annealing, and is especially useful in large vessels which cannot be annealed after fabrication by welding.

5 Claims, 4 Drawing Figures

METHOD OF MAKING WELDED JOINTS FOR LARGE VESSELS SUBJECT TO HYDROGEN EMBRITTLEMENT

CROSS-REFERENCE TO RELATED APPLICATIONS

This application is a continuation-in-part of co-pending Application Ser. No. 869,253, filed on Oct. 24, 1969 now abandoned, which in turn is a continuation-in-part of co-pending Application Ser. No. 627,889, filed on Apr. 3, 1967 now abandoned.

BACKGROUND AND SUMMARY OF THE INVENTION

This invention relates to welded joints which avoid hydrogen embrittlement and obviate the need for total annealing of the welded joints in multilayer vessels, such as reaction vessels or cylindrical tanks, adapted for use at elevated temperatures and pressures.

In high-temperature, high-pressure multilayer vessels or cylindrical tanks, the walls which constitute the vessels or tanks are naturally thickened by reason of strength required, and annealing must be performed at a temperature and over a period of time suitable for the type of steel, from standpoint of hardening, residual stress, etc. of the zones affected by the heat of welding.

Also, those vessels and cylindrical tanks exposed to such rigorous operating conditions which also involve reactions of charges including hydrogen must be fabricated of steel resistant to hydrogen embrittlement. Except for some varieties, anti-hydrogen embrittlement steels are usually hardened by the heat of welding and, where the hardening in the heat affected zones is serious, annealing is indispensable. However, vessels of very large diameters and great lengths cannot be completely annealed after fabrication by welding, because of the unavailability of the facilities to accomplish such an operation. In order, therefore, to omit the annealing treatment in the fabrication by welding of the vessels of the types described, considerations must be given to the problems of hardening, residual stress and hydrogen embrittlement.

DISCUSSION OF PRIOR ART

While the art of welding multilayer laminated bodies is well established and, indeed the art of joining steel sheets by welding is well developed, it does not appear that the art has progressed to the point where large vessels composed of multiple laminated layers have been fabricated successfully without annealing where the inner surfaces of such vessels must be composed of steel resistant to hydrogen embrittlement. Although the art knows the problem of joining sheets for fabrication of vessels with an inner layer resistant to corrosion. For example, an inner layer of tantalum has been proposed for such vessels. This requires tantalum clad material to be rolled or bent, cut, and welded in order to fabricate the vessel with a tubular or cylindrical surface and suitable heads or end portions. The tantalum is highly resistant to corrosion and forms a cladded or metallurgically joined layer upon a base sheet of material such as steel. However, the present invention is not concerned with a cladded layer of corrosion-resistant metal sheets. Rather, the present invention discloses an efficient method of welding multilayer sheets which are only mechanically joined without metallurgical bonding together. The problem of different melting points of the joined sheets is not a concern in the present invention as is the case in the prior art situation. In the present invention, unlike the prior art method, the problem to be solved is how to join large sheets for tanks and vessels without annealing on the plant site. As discussed hereinbelow this problem is solved by the present invention.

DESCRIPTION OF THE INVENTION

The present invention provides welded joints which solve the above problems and avoid the need for annealing the entire welded assembly including the adjoined surfaces in the weld zones. The invention is characterized by that, in multilayer fluid-containing vessels or the like made of Cr-Mo steel (Cr 1–4%; Mo 0.3–0.5%) or Mo steel (Mo 0.3–0.7%), the portion of each groove face in a joint to be welded which corresponds to the heat affected zone is padded or cladded with a Cr-Mo steel (Cr: 1–4%; Mo: 0.3–1.3%) or Mo steel (Mo:0.3–0.7%) including Ti and/or Nb which is only slightly hardenable by the heat of welding and is resistant to hydrogen embrittlement, and is annealed before the welding of the joint. Then the joint at its inner surface exposed to hydrogen embrittlement is filled and welded with a metal of the same type as the padding or cladding metal or with austenitic stainless steel or Inconel to the extent that the metal is, at least, thicker than the wall of the inner cylinder and the rest of the joint welded with a metal, such as low-carbon Cr-Mo steel, Mo steel which have the same alloy components as the multi-layer material but are intended to reduce the hardening by the heat of welding.

At the present time, pressure vessels or cylindrical tanks for use at high temperatures and high pressures are available both as single-walled containers fabricated by forging or by other working of thick plates and as multilayer containers fabricated by laminating a plurality of metal sheets helically or concentrically.

In case of the multilayer containers, the inner cylinders holding the fluid contents are made of steel or clad steel of the types suitable for the conditions to be possibly encountered in use. In a longitudinal weld of the inner cylinder, a steel having the same components and the same strength as the steel of which the inner cylinder is made is employed in the welding. For instance, in the case of the inner cylinder made of stainless steel clad steel, the base metal of which is Cr-Mo steel, welding is performed using stainless steel for the clad part and using Cr-Mo steel for the base metal part. The entire inner cylinder is then annealed and steel strips having the above-mentioned components are then laminated around the inner cylinder to a desired wall thickness. A unit cylinder, thus obtained, having a length equal to the width of the strip material is welded with another one to thus form a long multilayer vessel. In a circumferential weld between such unit cylinder and an end plate or flange, the heat affected zone is previously padded with the Cr-Mo steel or Mo steel including Ti and/or Nb. However, in the case of the inner cylinder made of anticorrosive materials not hardenable by the heat of welding or made of a steel clad with such material, the padding on a part made of the anticorrosive materials is not needed. In such padding, the amount of the included Ti is 4–7 times that of carbon (C × 4–7); in the case of Nb, the amount is 7–14 times that of carbon (C × 7–14); in the case of Ti and Nb, the amount is fixed by the relation $Nb + 2Ti = C \times 8-14$. Generally speaking, both Ti and Nb have great affinity with carbon and therefore carbides of Ti and/or Nb are produced, preventing a hard compound such as one having martensite texture from being formed by combination of iron with carbon contained in steel. Thus, hardening of steel due to the heat of welding can be prevented. If the amount of Ti and/or Nb is less than the above-mentioned one, such effect cannot be obtained. If said amount is more, the steel material will be brittle.

As to the circumferential joints, the heat affected zone is annealed for adjusting their hardness and also their texture. After the annealing has been finished, joint welding is performed in such a way that the inner portion of a groove is filled and welded with the same metal as the padding metal or austenitic stainless steel or Inconel for a thickness which is at least in excess of the wall thickness of the inner cylinder while the remaining portion is filled and welded with a weld metal such as low carbon Cr-Mo steel or Mo steel which is only slightly hardened by the heat of welding.

In a spirally wound multilayer vessel, which is not provided with a longitudinal weld in the layers, a welded joint is thus obtained which is resistant to hydrogen embrittlement and also is very tough, and annealing of the entire multilayer container can be eliminated. However, in a concentrically wound multilayer vessel, which is provided with a longitudinal weld in each layer, the surface of a groove of such weld is previously padded with the Cr-Mo steel or Mo steel including Nb and/or Ti and is then annealed, and further in assembling the layers welding is performed using low carbon Cr-Mo steel or Mo steel.

Since multilayer containers are provided with fluid vents of a depth not reaching through the inner layer or cylinder, the weld joints are formed all the more advantageously against hydrogen defaults.

DESCRIPTION OF SPECIFIC EMBODIMENTS

Figure 1A:
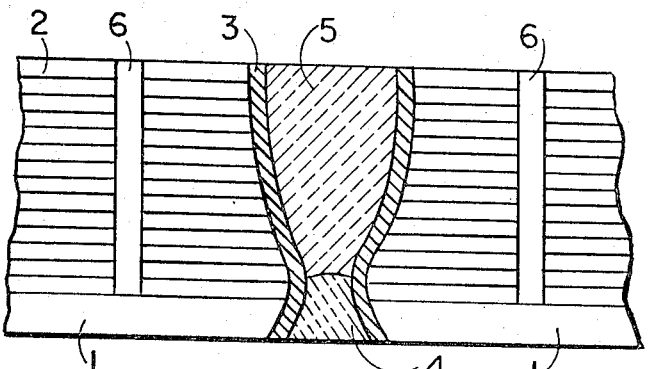
Figure 1B:
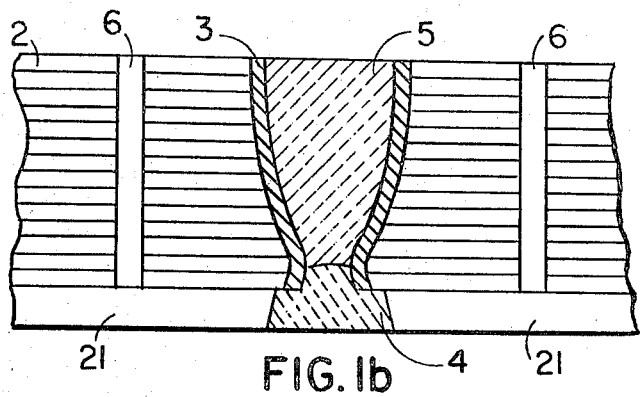
Figure 1C:
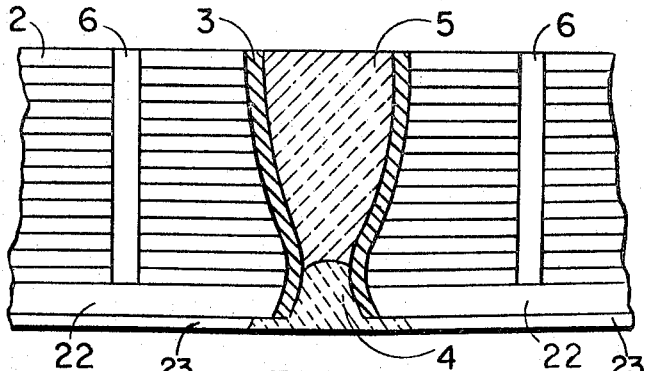
Figure 2:
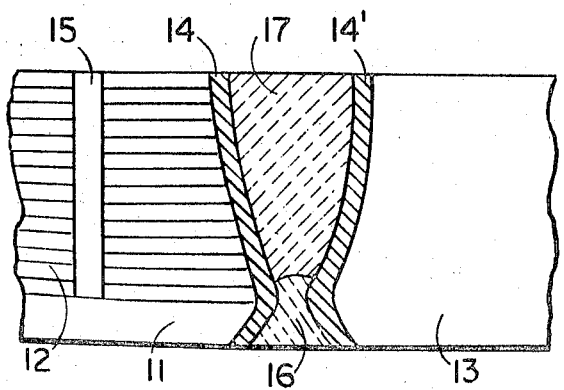

Some embodiments of the invention will be described in detail hereunder with reference to the accompanying drawings, wherein:

FIGS. 1a–1c are sectional views of three embodiments of a welded joint according to the invention; and FIG. 2 is a sectional view of a welded joint according to the invention for a unit block of a single-walled container or cylinder tank and a unit block of a multilayer vessel or cylindrical tank.

A weld joint for multi-layer containers, cylindrical tanks, etc., will be described with reference to FIG. 1a. In the figure, the welded joint shown comprises an inner cylinder 1, a laminate 2, a cladding 3 or weld zone in the inner cylinder, a cladding 3 weld zone in the laminate, deposited weld metal 4 on the portion contacting the fluid content or exposed to hydrogen embrittlement, deposited weld metal 5 other than the above, and fluid vents 6. In this case, the inner cylinder 1 forms a part of the multilayer barrel and is fabricated of steel plates, pipes, etc. On the groove or weld joint face of each circumferential joint, steel is only slightly hardenable by the heat of welding and is resistant to hydrogen embrittlement, namely, the Cr-Mo steel or Mo steel including Ti and/or Nb, is built up by welding to a thickness corresponding to the extent of the heat affected zone, and then the cladding 3 is annealed. The laminate is formed of Cr-Mo steel (Cr: 1–4%, Mo: 0.3–1.5%) or Mo steel (Mo: 0.3–0.7%). If the inner cylinder is formed of an anticorrosive and resistant to hydrogen embrittlement steel which is not hardened by the heat of welding, such as stainless steel, then the padding on the inner cylinder is not needed, as shown in FIG. 1b, in which the inner cylinder is designated by 21. Further, if the steel is clad steel, for instance, stainless steel clad steel, then stainless steel is removed from a part around a groove for a circumferential weld while all other parts are padded, as shown in FIG. 1c, in which the inner cylinder is designated by 22.

In the circumferential welding for connecting such unit cylinder, the deposited weld metal 4 is resistant to hydrogen embrittlement and is not hardened by the heat of welding, and is obtained by depositing the same metal as the padding metal or stainless steel or Inconel so as to be, at least, thicker than the inner cylinder. The remaining portion 5 is filled with weld metal which is only slightly hardened such as low carbon Cr-Mo steel or Mo steel.

By taking such measures, in welding the deposited weld metals 4 and 5, the heat affected zone is limited to the padded weld which remains unaffected by the heat of welding, and the base metal is unaffected. Since the deposited weld metal 4 is formed of a hydrogen-resisting steel, hydrogen which permeates through the deposited weld metal 5 will not attain sufficient partial pressure to embrittle said weld metal 5.

Further, the laminate 2 is provided with fluid vents 6 of a depth not reaching the inner cylinder and therefore hydrogen which permeates through the inner cylinder is freed into the air through the vents, without permeating through the laminate.

Referring now to FIG. 2, showing a welded joint for a container combining a multilayer barrel and a single-walled barrel, which comprises an inner cylinder 11 of the multilayer barrel 12, a single-walled barrel 13, cladding 14 and 14′ or weld zones on the inner cylinder 11 and single-walled barrel 13, respectively, a fluid vent 15, deposited weld metal 16 on the portion or surface contacting the fluid content in the vessel and deposited weld metal 17 of the joint other than the deposited weld metal 16.

In this embodiment, the single-walled barrel is provided with a cladding 14′ of the Cr-Mo steel or Mo steel including Ti and/or Nb which is only slightly hardened by the heat of welding and which is resistant to hydrogen embrittlement. The zone 14 is annealed. If the inner side of the barrel contacting a fluid is clad or padded with metal which is anticorrosive and is resistant to hydrogen embrittlement, such as stainless steel, then the metal is removed from a part around a groove.

On the other hand, a groove for the multilayer barrel is treated as in the case of FIG. 1a. Before performing circumferential welding, annealing is applied for improving a hardened portion of the base metal due to pad welding.

As to the following working examples, please refer to appended FIGS. 1a, 1b, 1c, and 2.

Example 1. (refer to FIG. 1a)

| Reference | Numerals: | |
|---|---|---|
| 2 | (0.5 Mo) | |
| 3 | (2¼Cr – Mo + (Nb + 2Ti = | $C \times 8 - 14$)) |
| 4 | AISI 309 or | Cr 22–25, Ni 12–14 |
|   | AISI 310 or stainless | Cr 25–28, Ni 20–22 |
|   | Inconel steel | Cr 15, Ni 75 |
| 1 | (2¼Cr – Mo) | |

Example 2. (refer to FIG. 1b)

| Reference | Numerals: | |
|---|---|---|
| 2 | (0.5 Mo) | |
| 3 | (1Cr − 0.5 Mo + (Nb + 2Ti = C × 8 − 14)) | |
| 4 | ⎧AISI 309 or<br>⎨AISI 310 or stainless<br>⎩Inconel steel | Cr 22–25, Ni 12–14<br>Cr 25–28, Ni 20–22<br>Cr 15, Ni 75 |
| 5 | (0.5 Mo) | |
| 21 | (1 Cr − 0.5 Mo) | |

Example 3. (refer to FIG. 1c)

| Reference | Numerals: | |
|---|---|---|
| 2 | (0.5 Mo) | |
| 3 | (2¼Cr − 1 Mo + (Nb + 2Ti = C × 8 − 14)) | |
| 4 | ⎧AISI 309 or<br>⎨AISI 310 or stainless<br>⎩Inconel steel | Cr–22–25, Ni 12–14<br>Cr–25–28, Ni 20–22<br>Cr 15, Ni 75 |
| 5 | (0.5 Mo) | |
| 22 | (2¼Cr − 1 Mo) | |
| 23 | (AISI 347 Ni–Cr, Stainless Steel containing Nb) | |

Example 4. (refer to FIG. 2)

| Reference | Numerals: | |
|---|---|---|
| 12 | (0.5 Mo) | |
| 13 | (2¼Cr − 1 Mo) | |
| 14,14' | (2¼Cr − 1 Mo + (Nb + 2Ti C × 8 − 10)) | |
| 16 | ⎧AISI 309 or<br>⎨AISI 310 or stainless<br>⎩Inconel steel | Cr 22–25, Ni 12–14<br>Cr 25–28, Ni 20–22<br>Cr 15, Ni 75 |
| 17 | (0.5 Mo) | |

Thereafter, the single-walled barrel and multilayer barrel are joined by welding with the deposited weld metal 16 of the same steel as used in the padded weld zone 14 or 14' and with stainless steel or Inconel so as to be thicker than the inner cylinder. The remaining deposited weld metal 17 is filled with weld metal which is only slightly hardened by the heat of welding, such as low carbon Cr-Mo steel or Mo steel. A vessel or cylinderical tank which has resistance to hydrogen embrittlement is thus fabricated without the need of overall annealing. Therefore, according to the present invention, fabrication by welding of a combination of single-walled flanges, end plates, and boiler plates with multilayer barrel or of the opposite combination can be effectively accomplished. Further, the present invention may also be applied to the welding in assembling a single-walled container.

More generally and concisely stated, the present invention provides welded joints for vessels or cylindrical tanks for use at elevated temperatures and pressures which avoid the need for overall annealing after welding, provides resistance to hydrogen embrittlement, and can be formed easily at low cost, and enables fabrication and erection of containers of the type described above at site, to a great practical advantage.

What is claimed is:

1. A welded joint for securing two sections of a large vessel together in which the interior of the large vessel is subject to hydrogen embrittlement, at least one of the sections to be joined being formed of a multilayered laminated construction composed of an interior layer and a plurality of outer layers which merely contact one another without metallurgical joining, said interior layer of the laminated construction providing the interior surface of the vessel and being formed of a material resistant to hydrogen embrittlement and said outer layers being formed of a steel selected from the group consisting of (a) steel containing from 1–4% Cr and from 0.3–1.5% Mo and (b) steel containing from 0.3–0.7%Mo, and the edge surface on each of said sections being disposed in opposed relationships and forming a welding groove therebetween, a weld deposit layer of austenitic stainless steel which is only slightly hardenable by the heat of welding and is resistant to hydrogen embrittlement being formed on each of said edge surfaces of the welding groove extending from the surface constituting the interior surface of the vessel for at least the thickness of the layer forming the interior layer of the laminated construction and including an annealed zone between said weld deposited layer and said edge surface on which it is deposited, a weld deposit of austenitic stainless steel which is only slightly hardenable by the heat of welding and is resistant to hydrogen embrittlement being fused in the welding groove between said weld deposit layers on said edge surfaces and forming the interior surface of said welding groove and having a thickness at least greater than the thickness of the interior layer of the multilayered laminated construction, and a weld metal which is only slightly hardenable by the heat of welding being fused within the remaining part of said welding groove extending outwardly to the exterior surface of said sections forming the vessel.

2. A welded joint as set forth in claim 1, wherein both of the edge surfaces in said welding groove are formed of multilayered laminated construction, a weld deposit layer of the same metal as the metal forming the outer layers of said multilayered laminated construction being deposited on the edge surfaces of said outer layers within said welding groove.

3. A welded joint as set forth in claim 1, wherein the other said section to be joined is formed of a single monolithic wall construction, said weld deposit layers of austenitic stainless steel formed on each of the edge surfaces extending for the thickness of the interior layer of the said multilayered laminated construction and for the entire thickness of said single monolithic wall construction, said weld deposit of austenitic stainless steel being fused between said weld deposits on said edge surfaces extending from the surfaces of said multilayered laminated construction and single monolithic wall construction forming the interior surface of the vessel outwardly for a depth at least greater than the thickness of the interior layer of said multilayered laminated construction.

4. A welded joint as set forth in claim 1, wherein fluid vent means which extend through said multilayered laminated construction of the vessel from the outer layer forming the outer surface of the vessel through the innermost of said outer layers to the outer face of said interior layer which forms the interior surface of the vessel.

5. Welded joints for securing sections of a large multilayer fluid-containing vessel together in which said sections consist of a plurality of layers which merely contact one another without metallurgical joining, and in which the interior surface of the vessel is hydrogen embrittlement resisting and is formed of a steel selected from the group consisting of (a) steel containing from 1–4%Cr and from 0.3–1.3% Mo and (b) steel containing 0.3–0.7%Mo the sections to be secured together forming a groove therebetween, each groove face of said joints being previously padded with a weld deposit layer of one of the said steels containing Cr and Mo or Mo, said steels containing C and at least one of Ti and Nb, the amount of Ti being at least four times that of C, the amount of Nb being from 8 to 14 times that of C and the sum of Nb and 2Ti being from 8 to 14 times that of C, said layer being hydrogen embrittlement resisting and not being hardened by the heat of welding, an annealed heat affected zone being in said groove, a weld deposit formed of a padding metal selected from the group consisting of stainless steel and Inconel being fused in said groove and having a thickness at least greater than inner layer of said multilayer vessel, and a weld metal which is only slightly hardened by the heat of welding being fused within the remainder of said groove, whereby the welded joint avoids the need for a complete annealing.

* * * * *